United States Patent Office 3,546,073
Patented Dec. 8, 1970

3,546,073
FUSARIUM FERMENTATION
Ralph Henry Evans, Jr., River Vale, N.J., Martin Paul Kunstmann, Pearl River, N.Y., Chester Eric Holmlund, Silver Spring, Md., and George Alfred Ellestad, Pearl River, N.Y., assignors to American Cyanamid Company, Stamford, Conn., a corporation of Maine
No Drawing. Continuation-in-part of application Ser. No. 710,623, Mar. 5, 1968. This application Aug. 13, 1968, Ser. No. 752,143
Int. Cl. C12d 9/04
U.S. Cl. 195—81
1 Claim

ABSTRACT OF THE DISCLOSURE

New compounds of Formulae I–VI are prepared by the cultivation under controlled aerobic conditions of Fusarium sepcies Z1272. Two of these compounds (Compounds V and VI) are transformed by chemical methods to new Compounds VII and VIII, respectively. All the compounds of this invention have antimicrobial activity, and selected members also have analgesic and hypocholesteremic activities.

This application is a continuation-in-part of our copending application Ser. No. 710,623, filed Mar. 5, 1968, now abandoned.

This invention relates to new chemical compounds and compositions having antimicrobial and hypocholesteremic and analgesic activities; and to fermentative and synethetic methods for preparing these compositions and compounds.

The invention is, in one aspect, based upon the discovery that the cultivation under controlled conditions, of a previously unisolated strain of fungus of the genus Fusarium leads to the formation of a new antimicrobially active culture medium. Another aspect of this invention resides in the finding that the active culture medium can be worked-up to yield a number of new compounds, all of which have antimicrobial activity, some of which also have hypocholesteremic activity and analgesic activity. Still another aspect of the present invention is the chemical conversion of two of said new compounds to derivatives which also exhibit the useful activities noted above. Other aspects of this invention will be apparent from the ensuing description thereof.

The novel compounds of the present invention may be represented by the following general Formulae I–VIII:

(I) 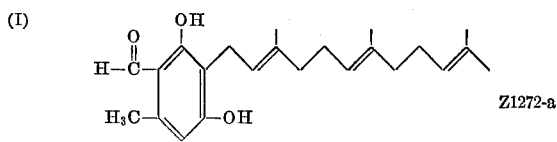

(II) 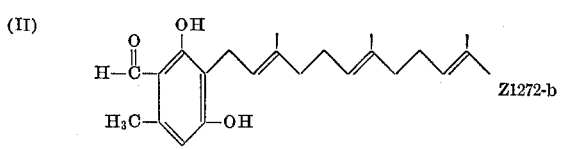

(III) 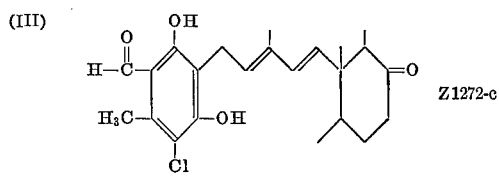

(IV) 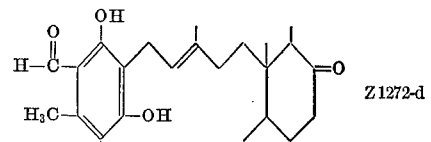

(V) 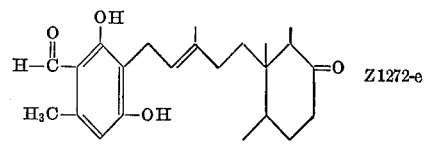

(VI) 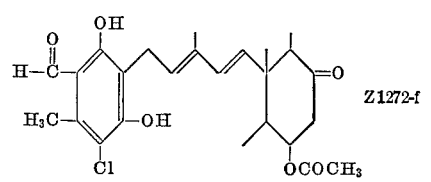

(VII) 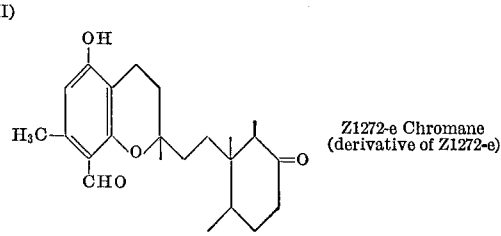

(VIII) 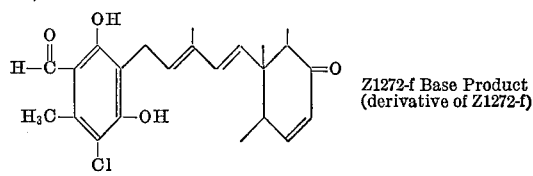

The new compounds of Formulae I–VI are formed during cultivation under controlled conditions of Fusarium Z1272. The organism was isolated from a soil sample collected in southern Wisconsin. A viable culture of the organism has been deposited with the Culture Collection Laboratory, Northern Utilization Research and Development Division, United States Department of Agriculture, Peoria, Ill. and has been added to its permanent collection. It is freely available in this repository under its Accession Number NRRL 3305.

DESCRIPTION OF THE ORGANISM

The following is a general description of the organism based on observed diagnostic characteristics. The descriptive colors are taken from Jacobson et al., "Color Harmony Manual" 3rd Ed. (1948).

The organism is a higher fungus isolated from a sedge-meadow soil collected in southern Wisconsin. It grows readily on a variety of artificial media at 20–25° C. In the study of the taxonomic aspects of the culture, Petri dishes of potato-dextrose, malt extract, cornmeal and Czapek's solution agars were inoculated and incubated at ambient room temperature for 14 days. Observations of cultural and morphological characteristics are recorded in the description below.

Colonies on potato-dextrose agar spread 5–6 cm. in diameter in 14 days. Mycelium was white, loose and floccose and became strongly fasciculate in age. Rust-colored sectors, which formed prominently in the colonies, were covered with thin arachnoid whitish mycelium. Reverse was cream-colored except beneath sectors where it was rusty orange.

On malt extract agar, colonies spread 4–5 cm. in diameter in 14 days. Mycelium was white, loose to arachnoid and became fasciculate in age. Sectors were prominent in yellowish-orange to yellowish-brown shades. Conidia were produced abundantly in gelatinous masses in the sectors.

Colonies spread broadly on cornmeal agar, extending 6–7 cm. in diameter in 14 days. Mycelium was thin and arachnoid, lightly zonate, and with numerous sectors. Reverse was colorless to whitish.

On Czapek's solution agar, colonies spread 4–5 cm. in diameter in 14 days. Mycelium was white, loose, floccose and fascicled. Greenish sectors covered with whitish arachnoid mycelium were commonplace. Reverse was mostly cream-colored, but with olive-green beneath sectors.

Macroconidia were produced abundantly on malt and potato-dextrose agars in the sectoring zones; only rarely were they formed in non-sectoring areas. The conidia developed in clumps on the ends of simple to sparingly branched conidiophores, which arose from trailing fascicles of mycelium. In older cultures yellowish-brown pionnotes of conidial masses were formed. Although macroconidia were produced on the other media used, they were much less abundant.

The macroconidia were mostly 3-septate, but occasionally spores with fewer septa or even aseptate ones were encountered. The conidia were slightly curved, sickle-shaped bodies with rounded ends and measured 24.0–60.0$\mu$ x 3.5–6.0$\mu$. Microconidia were not formed on the media employed.

Chlamydospores were formed sparsely on all the media used. They were mostly globose, single-celled 6.0–10.0$\mu$ in diameter and arose in both terminal and intercalary positions on the mycelium.

These characteristics observed for the fungus Z–1272 place it in the genus Fusarium. It is to be understood that for the production of the novel compounds the present invention is not limited to the use of this particular organism or to organisms fully answering the above growth and microscopic characteristics which are given for illustrative purposes. In fact, it is desired and intended to include the production of these compounds through the use of mutants produced from the described organism by various mutating means, such as by X-radiation, ultraviolet radiation, nitrogen mustard, and the like.

THE FERMENTATION PROCESS

Cultivation of the organism Fusarium species Z–1272 may be carried out in a wide variety of liquid culture media. Media which are useful for the production of the novel compounds include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chlorine, etc. Trace elements such as boron, molybdenum, copper, etc., are supplied as impurities of other constituents of the media. Aeration in tanks and bottles is provided by forcing sterile air through or onto the surface of the fermenting medium. Agitation in tanks is provided by a mechanical impeller. An antifoaming agent, such as 1% octadecanol in lard oil may be added as needed.

INOCULUM PREPARATION

Shaken flask "seed" inoculum is prepared by inoculating 100 milliliter portions of sterile liquid medium in 500 milliliter flasks with scrapings or washings of spores from an agar slant of the culture. The following medium is ordinarily used.

Molasses—20 grams
Cerelose—10 grams
Bacto-peptone—5 grams
Water to 1,000 milliliters The flasks are incubated at a temperature from 25–29° C., preferably 28° C., and agitated vigorously on a rotary shaker for 30 to 48 hours. These 100 milliliter portions of seed inoculum are used to inoculate one liter and twelve liter batches of the same medium in 2 liter and 20 liter glass fermentors. The inoculum mash is aerated with sterile air while growth is continued for 38 to 48 hours. These batches of inocula in turn are used to inoculate tank fermentors.

TANK FERMENTATION

For the production of the novel compounds of this invention in tank fermentors, the following fermentation medium is preferably used.

Molasses—20 grams
Cerelose—10 grams
Bacto-peptone—5 grams
Water to 1,000 milliliters Each tank is inoculated with 3 to 10% of inoculum made as described above. Aeration is supplied at the rate of 0.5–1.0 liter of sterile air per liter of broth per minute and the fermenting mixture is agitated by an impeller driven at 200–400 r.p.m. The temperature is maintained at 25–29° C., usually at 28° C. The fermentation is ordinarily continued for 72–120 hours, at which time the mash is harvested.

ISOLATION PROCEDURE

After the fermentation is completed, the fermented mash containing the novel compounds of this invention is adjusted to about 2.5 to 3.5, and the mash is extracted with a water immiscible polar solvent such as ethyl acetate using about 500 ml. of solvent per liter of mash for each extraction. The extracts are pooled and concentrated under reduced pressure to an oil-like residue. A column charge is prepared by dissolving the residue in acetone or some other suitable solvent, as for example, chloroform or methylene chloride, adding sufficient silica gel to absorb the mixture and removing the solvent by evaporation under reduced pressure at about 50° C. The dry charge is placed onto a silica gel column slurry packed with hexane, and the column is developed successively with hexane, a gradient between equal volumes of hexane and methylene chloride and finally with methylene chloride. The column effluent, continuously monitored using percent transmission at about 290 m$\mu$, is collected in separate fractions of suitable volume. A total of approximately 50 hold-back-volumes is needed to elute all of the described novel compounds produced by the fermentation.

The percent transmission at about 290 m$\mu$ indicates peaks which correspond to the various component compounds. The effluent corresponding to the first peak contains fermentation oils and is discarded. The second peak of the effluent contains the compound of Formula I, i.e., Z1272–a. Other component compounds, Z1272–b, Z1272–c, Z1272–d, Z1272–e, and Z1272–f are contained in successive peaks. Fractions of effluent comprising particular peaks are pooled and the component compounds are recovered therefrom using standard techniques.

CHEMICAL CONVERSION

The compounds of Formulae VII and VIII are obtained from two of the novel compounds produced by the foregoing fermentation process.

Thus the derivative of Formula V is treated under mild temperature conditions with a strong acid (e.g. concentrated sulfuric acid) for a short time. The resulting solution is cooled by pouring onto cracked ice and the mixture is extracted with a solvent. The extract containing the desired compound is washed with water, dried and concentrated to a residue from which the compound of Formula VII, in pure form, can be obtained by chromatographic methods.

The conversion of the compound of Formula VI (Z1272–f) to the compound of Formula VIII is effected by basic hydrolysis using a reagent such as methanol and alkali under conditions of elevated temperature. The reaction mixture is cooled and acidified and the acidified solution extracted with a solvent such as ether. The dried extracts are evaporated to give a residue containing the compound of Formula VIII. The latter can be purified by conventional recrystallization and chromatographic techniques.

PROPERTIES AND USES

The compounds of Formulae I–VIII inclusive, all exhibit in vitro antiprotozoan activity as shown in a broth dilution test with a culture of *Tetrahymena pyriformis*. Each compound shows activity at a level significantly lower than 500 γ/ml. as evidenced by the data in the following table.

Table.—In vitro antiprotozoan activity against *Tetrahymena pyriformis*

| Test compound: | Concentration for 50% inhibition (γ/ml.) |
|---|---|
| Z1272–a | 200 |
| Z1272–b | 200 |
| Z1272–c | 50 |
| Z1272–d | 16 |
| Z1272–e | 5 |
| Z1272–f | 17 |
| Z1272–e chromane | 15 |
| Z1272–f base product | 30 |

Representative in vitro antimicrobial and antifungal activities of compounds of Formulae I–VIII are presented in the following table. This table shows the minimal inhibitory concentration of the novel compounds required to inhibit the growth of representative microorganisms in a nutrient medium.

TABLE.—IN VITRO MINIMAL INHIBITORY CONCENTRATIONS (μg./ml.)

| Organism | Compound conc. (μg./ml.) | | | |
|---|---|---|---|---|
| | II | IV | V | VI |
| *Mycobacterium smegmatis* ATCC 607 | 62 | | 250 | |
| *Staphylococcus aureus* ATCC 6538P | 125 | | | |
| *Bacillus subtilis* ATCC 6633 | | 31 | 62 | 250 |
| *Staphylococcus aureus* Smith ATCC 14154 | | | 62 | |
| *Chaetomium globosum* H–71 QM 6694 | | | | 125 |

Additionally Compounds III, VII and VIII show analgesic activity in mice. Hypocholesteremic activity is shown by Compounds III, IV, VI and VIII. Compounds I, II and VII exhibit activity against *Mycoplasma gallisepticum* a pleuropneumonia-like organism (PPLO) in chick embryos. All of the activities indicated above are at non-toxic dose levels. The specific procedure which was employed to measure hypocholesteremic activity is described below.

HYPOCHOLESTEREMIC TEST AND RESULTS

The hypocholesteremic activity of several of the novel compounds of the present invention has been indicated in tests run with mice and with rats.

Tests with mice were run as follows. The feed diet used in the tests is prepared using Purina Laboratory Chow® feed pellets for small laboratory animals, sold by the Ralston Purina Company, St. Louis, Mo. The pellets are ground into a homogeneous mixture and used in this form for control mice. For test mice, appropriate amounts of test compound to produce various dosages are added as a solution in a volatile solvent to separate portions of the ground pellets. The mixture is air dried while mixing to remove the solvent. Feed containing the test compounds was given to groups of three mice, C3H strain from Wycoff Breeding Colony. A control group of twelve mice are given the homogeneous feed with no test compound. All mice are allowed water and feed ad libitum. The mice are sacrificed on the sixth day and serum cholesterol concentrations are determined and expressed in milligrams per 100 milliliters. Methods of analysis, modified for use with an automatic analyzer, are based either on the saponification and extraction method of P. Trinder, Analyst 77, 321 (1952) or on the extraction method of H. H. Leffler, Amer. J. Clin. Path., 31, 310 (1959) and in each instance followed by a colorimetric determination of Zlatkis et al., J. Lab. Clin. Med., 44, 486 (1953).

The acceptance or rejection of a test compound as being active is based on the following criteria. A compound is considered active in this test if it causes a depression of the serum cholesterol of 15% or more as compared to the control value.

TABLE.—SERUM CHOLESTEROL LOWERING IN MICE

| Test compound (formula number) | Dosage percent of feed | Serum cholesterol, percent lowering |
|---|---|---|
| III | 0.1 | (¹) |
| | 0.03 | 20 |
| | 0.01 | (²) |
| VI | 0.1 | 16 |
| VIII | 0.1 | 30 |
| | 0.03 | 24 |
| | 0.01 | 21 |

¹ 3/3 dead; retest 20%.
² Inactive.

Tests with rats were run substantially as the described test run with mice. Generally, the test compounds were given to groups of four male rats, CFE strain from Carworth Farms. The control group consisted of eight rats. The table below, shows the test results expressed as percent lowering of serum cholesterol of test rats as compared to control rats. A compound is considered active if it causes a depression of the serum cholesterol of 15% or more as compared to the control value.

TABLE.—SERUM CHOLESTEROL LOWERING IN RATS

| Test compound (formula number) | Dosage, percent of feed | Serum cholesterol percent lowering |
|---|---|---|
| III | 0.05 | 30, 26 |
| | 0.03 | 25, 27 |
| | 0.01 | 24, 30 |
| | 0.003 | (¹) |
| | 0.001 | (¹) |
| IV | 0.05 | 28, 25 |
| VIII | 0.05 | 45 |
| | 0.03 | 32 |
| | 0.01 | (¹) |

¹ Inactive.

Compounds of the present invention can be used as antimicrobial agents in a variety of ways. By virtue of their in vitro activity against a wide variety of microorganisms they can be used as the active components of disinfectant compositions for general household use (e.g. to disinfect glassware). By virtue of their in vivo antimicrobial activity they can be used as antibiotics in both human and veterinary medicine. The effective dosage for medicinal use is readily determined by methods which have been conventionally used in the case of other broad spectrum antibiotics such as the tetracyclines. Additionally, the compounds which have hypocholesteremic and analgesic activity can be used as the active components of analgesic and hypocholesteremic compositions, respectively, by means in dosages which can be determined by conventional pharmacological procedures.

The following examples are presented to further illustrate this invention.

EXAMPLE 1

Inoculum preparation

A typical medium used to grow the primary inoculum is prepared according to the following formula:

Molasses—20 grams
Cerelose—10 grams
Bacto-Peptone—5 grams
Water to 1,000 milliliters The washed or scraped spores from an agar slant were used to inoculate two 500 ml. flasks containing 100 milliliters each of the above medium. The flasks were placed on a rotary shaker and agitated vigorously for 48 hours, at 28° C. The resulting flask inoculum was transferred to a 5 gallon glass fermentor containing 12 liters of sterile medium. The glass fermentor was aerated with sterile air while growth was carried out for about 48 hours, after which the contents were used to seed a 300 l. tank fermentor.

EXAMPLE 2

Fermentation

A fermentation medium is prepared according to the following formula:

Molasses—20 grams
Cerelose—10 grams
Bacto-Peptone—5 grams
Water to 1,000 milliliters The fermentation medium was sterilized at 120° C. with steam at 15 pounds pressure for 45–60 minutes. The pH of the medium after sterilization was 5.7. Three hundred liters of sterile medium in a 400 liter tank fermentor was inoculated with 12 liters of inoculum prepared as described in Example 1, and the fermentation was carried out at 28° C. using Hodag LG–8 oil as a defoaming agent. Aeration was supplied at the rate of 0.5 liter of sterile air per liter of mash per minute. The mash was agitated by an impeller driven at 300 revolutions per minute. At the end of approximately 90 hours of fermentation time, the mash was harvested.

EXAMPLE 3

Isolation

Three hundred liters of fermented mash is adjusted to pH 3.0 and without filtration, the whole mash is extracted with ethyl acetate twice using 500 ml. of ethyl acetate per 1000 ml. of mash. The ethyl acetate extracts are pooled and the solvent is evaporated under reduced pressure to yield an oil-like residue (weighing 225 g.). An additional 300 liters of fermented mash obtained from another tank is treated as described and the resultant oil-like residue (in this instance weighing 42 g.) is combined with the first residue.

Sufficient acetone is added to dissolve the combined residue and 500 g. of silica gel is added. The suspension is well-stirred to adsorb the residual material and the solvent is evaporated under reduced pressure at 50° C. The charge is placed onto a silica gel column (dry weight 1500 g.) slurry-packed with hexane. The column is developed with 5 liters of hexane followed by a gradient between 40 liters of hexane and 40 liters of methylene chloride and finally with 30 liters of methylene chloride. The effluent is continuously monitored using percent transmission at 290 m$\mu$, and separate fractions of about 400 ml. are collected and later appropriately pooled. The effluent comprising the first peak, about 17.8 liters, contains fermentation oils and is discarded. The second peak, about 13.9 liters, contains Z1272–a (Compound I). The third peak, comprising the next 7.8 liters, contains the $\beta$ component, Z1272–b (Compound II). The fourth peak, comprising the next 18.2 liters is a mixture of both Compounds III and IV which may be separated by fractional crystallization. The fifth peak, comprising the following 16.2 liters of effluent, contains Compound IV and impurities. The following 8.0 liters of effluent contain Compound VI, and the next succeeding 11 liters contain both Compounds V and VI, which are separated by fractional crystallization. The following 20 liters of effluent contain Compound V.

EXAMPLE 4

Isolation of Compound I

The 13.9 liters of effluent containing Compound I obtained from the silica gel column of Example 3 is concentrated to a small volume. Crystalline Compound I is obtained on the addition of heptane to the concentrate, and separated by filtration, wt. 6.17 g., M.P. 78–81° C. The analytical sample is recrystallized from a mixture of methanol and water yielding colorless crystals, M.P. 72.5–73° C.

EXAMPLE 5

Isolation of Compound II

The 7.8 liters of effluent obtained from the silica gel column of Example 3 containing Compound II is concentrated to a small volume. Crystalline product is obtained on the addition of hexane to the concentrate. The crystals are separated by filtration, wt. 2.5 g., M.P. 96–98° C. Recrystallization from a mixture of methanol and water yielded pure Z1272–b, M.P. 97.5° C.

EXAMPLE 6

Isolation of Compounds III and IV

The 18.2 liters of effluent containing Compounds III and IV obtained from the silica gel column of Example 3 is concentrated to a small volume. Hexane is added to the concentrate and 34.8 g. of crystals were separated. Fractional crystallization of the crystalline mixture from either acetone-hexane or methanol gave 12.6 g. of pure Compound III, M.P. 172–173° C. and 5.8 g. of pure Compound IV, M.P. 129.5–130.5° C.

EXAMPLE 7

Isolation of Compound IV

The 16.2 liters of effluent containing Compound IV from the column of Example 3 is concentrated under reduced pressure to dryness. The residue was further purified by means of partition chromatography on 1500 g. Celite®. The column support is prepared by mixing 0.5 ml. of the lower phase from the system heptane-methanol (1:1) for each 1 g. of Celite. The residue dissolved in a small amount of the lower phase was treated similarly and packed on top of the column, which was then eluted with the upper phase. On evaporation of the effluent containing the major peak and subsequent crystallization from a mixture of ethyl acetate-hexane, 5.3 g. of purified Compound IV is obtained, M.P. 129.5–130.5° C.

EXAMPLE 8

Isolation of Compounds V and VI

The 11 liters of effluent containing both Compounds V and VI obtained from the silica gel column of Example 3 is concentrated to a small volume. Subsequent fractional crystallization from acetone-hexane yields 2.3 g. of Compound VI, M.P. 151–154° C. and 4.0 g. of Compound V, M.P. 172–173° C. The 8 liters of effluent containing Compound VI alone is concentrated to a residue and the residue is dissolved in acetone. The 2.3 g. of Compound VI obtained from the above procedure is added to the acetone solution and hexane is added to induce crystallization. About 4.2 g. of pure Compound VI is obtained, M.P. 155.5–156.5° C.

EXAMPLE 9

Isolation of Compound V

The final 20 liters of effluent containing Compound V obtained from the silica gel column of Example 3 is concentrated to an oil (volume approximately 10 ml.). The oil is dissolved in acetone and hexane is added to induce crystallization. About 4.1 g. of pure Compound V is obtained, M.P. 172.5–173.5° C.

EXAMPLE 10

Preparation of Compound VII

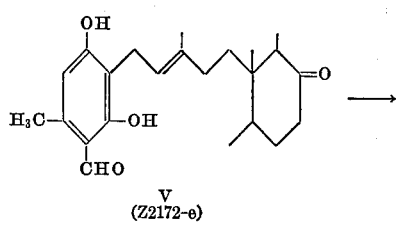

V
(Z2172-e)

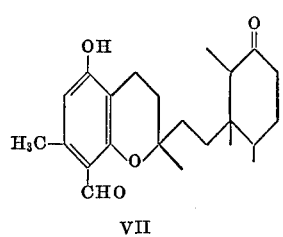

VII

To 8 ml. of concentrated sulfuric acid is added 200 mg. of Compound V and the solution is allowed to stand at room temperature for 30 minutes. The solution is then poured onto cracked ice and the mixture is extracted with methylene chloride. The extract is washed with water, dried with anhydrous sodium sulfate, and concentrated to a residue which is chromatographed on silica gel. Elution of the column with 2% ethyl acetate-in-benzene removes a minor amount of the isomeric chromane derivative. Elution of the column with 20% ethyl acetate-in-benzene yields the major chromane derivative Compound VII as white crystals, M.P. 192–194° C., $[\alpha]_D^{25} = 0° = 6$ (c. 0.475, CHCl₃). The chromane has an $R_f$ of 0.45 on thin layer chromatography (silica gel $F_{254}$, 10% ethyl acetate-in-benzene to develop, UV light to detect). The microanalytical sample is obtained by recrystallization from benzene-hexane followed by drying under standard conditions.

*Analysis.*—Calc'd for $C_{23}H_{32}O_4$ (372.5) (percent): C, 74.16; H, 8.66. Found (percent): C, 73.86; H, 8.47.

In the infrared (KBr pellet), the chromane had significant bands at 1710, 1667, 1640 and 1587 cm.⁻¹, and in the ultraviolet (methanol) (Fulmor 66–3398), it shows maxima at 224, 233, 286, and 315 (sh.) mμ (ε; 13,000, 13,400, 13,400 and 6,340 respectively). In its NMR spectrum (60 mc., CDCl₃) (Fulmor 66–3398), it has an aldehydic hydrogen at 625 cps. and an unchelated, deuterium-exchangeable hydroxyl at 461 cps. (both relative to tetramethylsilane as reference).

EXAMPLE 11

Preparation of Compound VIII

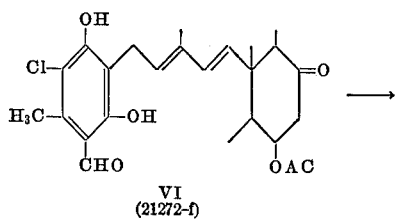

VI
(21272-f)

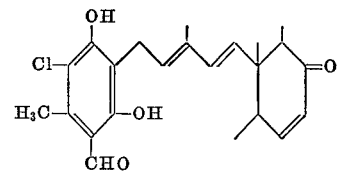

VIII
(base product of Compound VI)

To 80 ml. of warm methanol containing 2.0 g. of Compound VI is added 80 ml. of 0.1 N sodium hydroxide. The resulting solution is warmed on the steam bath for one hour and then cooled and acidified (to pH 3) with 5 N hydrochloric acid. The acidified solution is extracted with two 200 ml. portions of ether. The extracts are combined, dried with anhydrous sodium sulfate and evaporated to a residue. This residue is subjected to crystallization from warm methanol to give 1.44 g. of impure base product. This material is purified by partition chromatography on a Celite 545 column (1.0 kg.) using a methanol-heptane solvent system. The fractions containing the base product, located by their absorption at 292 mμ, are combined and concentrated to a residue, which, upon recrystallization from methanol give a total of 1.0 g. of purified base product (Compound VIII). A microanalytical sample is prepared by recrystallization from methanol followed by drying under standard conditions, M.P. 125–130° C. and 160–163° C.

*Analysis.*—Calc'd for $C_{23}H_{27}O_4Cl$ (402.9) (percent): C, 68.56; H, 6.75; O, 15.89; Cl, 8.80. Found (percent): C, 68.37; H, 6.79; O, 15.95; Cl, 8.97.

The ultraviolet spectrum (Fulmor 66–2626) measured in methanol. had maxima at 234, 292 and 347 mμ (ε 45,300, 12,900 and 9500 respectively). When measured in basic methanol, it has maxima at 224, 258(sh.) and 347 mμ (ε 44,300, 17,000, and 31,500, respectively). The infrared spectrum (KBr disk) (Fulmor 66–2626) has pertinent bands at 1675 and 1637 cm.⁻¹. The n.m.r. spectrum (60 mc., CDCl₃) (Fulmor 66–2626) no longer shows the acetate methyl peak at 124 cps. (which is in the spectrum of Compound VI) but instead shows two hydrogens at 396 and 356 cps. (relatively to tetramethylsilane as reference).

What is claimed is:

1. A process which comprises cultivating Fusarium species (Z1272) NRRL 3305 in an aqueous nutrient medium containing assimilable sources of carbohydrate, nitrogen and inorganic salts under submerged aerobic conditions until substantial antimicrobial activity is imparted to said medium by the production of a compound of the group consisting of those represented by the formulae:

(I)

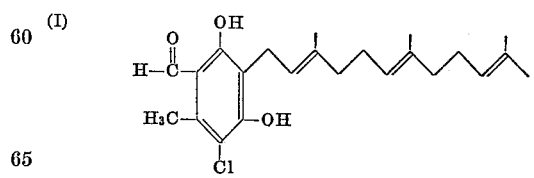

(II)

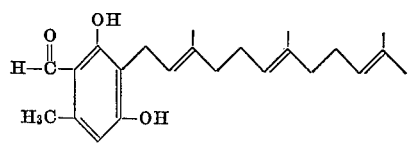

(III) 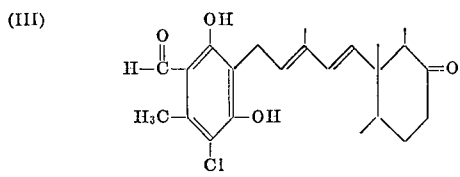
(IV) 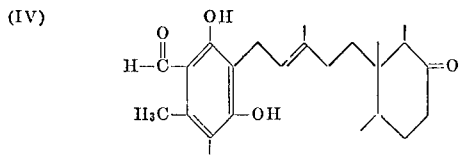
(V) 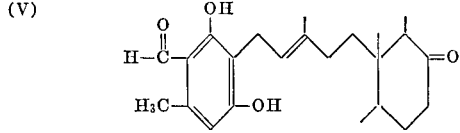
(VI) 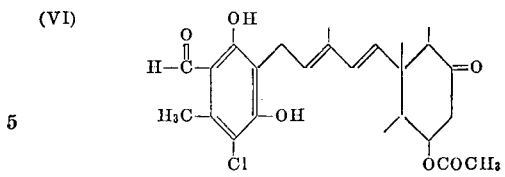
and recovering said compounds.
References Cited
Chemical Abstracts, vol. 56, 1962, p. 5194i.
Chemical Abstracts, vol. 66, 1967, p. 84744u.
Chemical Abstracts, vol. 68, 1968, p. 19888w.
JOSEPH M. GOLIAN, Primary Examiner
U.S. Cl. X.R.
260—345.2, 488, 586, 600; 424—308, 331